United States Patent Office 3,649,672
Patented Mar. 14, 1972

3,649,672
CARBOXYLIC ACID ESTERS OF 3-FORMYL-BUTANOL-1 AND PROCESS
Walter Himmele, Walldorf, Werner Aquila, Ludwigshafen, and Richard Prinz, Waiblingen, Germany, assignors to Badische Anilin- & Soda-Fabrik Aktiengesellschaft, Ludwigshafen (Rhine), Germany
No Drawing. Filed Apr. 10, 1970, Ser. No. 27,431
Claims priority, application Germany, Apr. 12, 1969,
P 19 18 694.8
Int. Cl. C07c *67/00, 69/14, 69/24*
U.S. Cl. 260—488 F        7 Claims

ABSTRACT OF THE DISCLOSURE

Manufacture of carboxylic acid esters of 3-formylbutanol-1 comprising the conversion of bis(monocarboxylic acid esters) of butene-2-diol-1,4 with carbon monoxide and hydrogen in the presence of carbonyl complexes of rhodium at temperatures of more than 110° C. to 150° C. and pressures of from 150 to 800 atmospheres. Carboxylic acid esters of 3-formylbutanol-1 are intermediates in the manufacture of vitamin A esters.

---

This invention relates to carboxylic acid esters of 3-formylbutanol-1 and a process for the manufacture thereof by oxo synthesis.

A generally used commercial process for the manufacture of aldehydes is the oxo process which comprises contacting olefinically unsaturated compounds with carbon monoxide and hydrogen in the presence of carbonyl complexes of metals in Group VIII of the Periodic Table, for example cobalt carbonyl. Besides olefins themselves, a number of olefinically unsaturated compounds containing functional groups have also been converted by the oxo process. Thus it is disclosed in J. Amer. Chem. Soc., 71, 3053 (1949) that the oxo process may be employed to produce γ-acetoxy butyraldehyde from allyl acetate, α-butoxy propionaldehyde from butyl vinyl ether, ethyl β-formylbutyrate from ethyl crotonate, diethyl, α-formylsuccinate from diethyl fumarate, and succinodialdehyde-1,1-diacetate from allylidene diacetate.

Thus it was to be expected that the reaction of carboxylic acid esters of butene-2-diol-1,4 by the oxo method would produce bis(monocarboxylic acid esters) of 2-formylbutanediol-1,4.

It is an object of the invention to provide a process in which hitherto unobtainable carboxylic acid esters of 3-formylbutanol-1 are produced in a simple manner. Another object is to provide a process which produces good yields.

In accordance with the present invention these and other objects and advantages are achieved by means of a process for the manufacture of carboxylic acid esters of 3-formylbutanol-1 which comprises contacting bis(monocarboxylic acid esters) of butene-2-diol-1,4 with carbon monoxide and hydrogen in the presence of carbonyl complexes of rhodium at temperatures of more than 110° C. to 150° C. and at pressures of from 150 to 800 atmospheres.

Our new process is peculiar in that the introduction of a formyl group causes elimination of a molecule of acetic acid.

The preferred bis(monocarboxylic acid esters) of butene-2-diol-1,4 are the esters with saturated fatty acids of from 1 to 18 carbon atoms and benzoic acid which may be substituted by one or two alkoxy or alkyl groups having from 1 to 4 carbon atoms, chlorine atoms, nitro groups or amino groups. Particularly preferred are the esters of lower fatty acids, especially those of from 1 to 4 carbon atoms. Suitable starting materials are, for example, the diformate, diacetate, dipropionate, dibutyrate, diisobutyrate, dipalmitate, dibenzoate and di-p-chlorobenzoate of butene-2-diol-1,4 and also 1-acetoxy-4-benzoxy-butene-2.

The carbon monoxide and hydrogen are generally used in the ratio of from 2:1 to 1:2 and preferably of about 1:1, by volume. It is possible to use the dicarboxylic acid ester of buten-2-diol-1,4 and the mixture of carbon monoxide and hydrogen in stoichiometric amounts.

The reaction is carried out at temperatures of from more than 110° C. to 150° C. Particularly good results are obtained when using temperatures of from 120 to 140° C. The reaction is also carried out at pressures ranging from 150 to 800 atmospheres, the preferred pressures being from 350 to 800 atmospheres.

The reaction is effected in the presence of carbonyl complexes of rhodium. Preferably, from 0.1 p.p.m. to 2% by weight of rhodium (calculated as metal) are used based on the quantity of bis(carboxylic acid ester) of butene-2-diol-1,4 used. We have found amounts of from 0.001 to 0.1% by weight to be particularly advantageous. The carbonyl complexes may be preformed or, alternatively, the starting materials for the carbonyl complexes, such as halides, oxides or fatty acid salts of rhodium, may be separately fed to the reaction. The catalyst is then formed in situ under the conditions of reaction. We have also found it advantageous to include modifiers, suitable modifiers being, for example, esters of phosphorus acid with alkanols, cycloalkanols or phenols; and tri-substituted phosphines containing, as substituents, alkyl, cycloalkyl or phenyl radicals. The modifiers are conveniently used such that the atomic ratio of rhodium to phosphorus is from 1:1 to 1:4.

It is beneficial to carry out the reaction using inert solvents such as hydrocarbons, for example benzene, cyclohexane, xylene, hexane or iso-octane; ethers, for example diethyl ether, tetrahydrofuran or dioxane; esters, for example ethyl acetate or methyl propionate; and alkanols, for example methanol or butanol. However, the reaction may be carried out without the addition of solvents, if desired.

The process of the invention is carried out, for example, by placing the bis(monocarboxylic acid ester) of butene-2-diol-1,4 in an autoclave together with any inert solvent and the specified amount of catalyst and contacting is with a hydrogen/carbon monoxide mixture at the stated pressures and temperatures. After releasing the pressure and cooling, the reaction mixture is separated from the catalysts by distillation. The carboxylic esters of 3-formylbutanol-1 are then isolated from the resulting mixture by known methods, such as fractional distillation. Unconverted starting materials may be recycled to the reaction, if desired. The reaction may be operated continuously using suitable equipment.

The carboxylic acid esters of 3-formylbutanol-1 produced by the process of the invention are subjected to chlorination and then to dehydrohalogenation to form β-formylcrotyl acetate, which is converted to vitamin A acetate by condensation with the $C_{15}$ phosphonium salt as described by Wittig.

In the following examples the parts are by weight unless otherwise stated. The parts by weight relate to the parts by volume as the kilogram to the liter.

EXAMPLE 1

In a stainless steel high pressure reaction vessel having a capacity of 700 parts by volume there are placed 172 parts of butene-2-diol-1,4 diacetate and 0.005 part of rhodium-III chloride. The vessel is purged with nitrogen, and a mixture of carbon monoxide and hydrogen in a ratio of 1:1 by volume is pumped in until the pressure in the vessel reaches 50 atmospheres. The reaction mixture is heated at 130° C. and the pressure is raised to 200 atmospheres by pumping in more of the said mixture. A total of 270 atmospheres is absorbed during 4 hours. After cooling and releasing the pressure, the solvent is removed from the reaction mixture by distillation at 20 mm. of mercury, and the residue is then fractionally distilled at 75° C. and 6 mm. There are thus obtained 97 parts of a mixture shown by gas chromatographic analysis to contain 61% of 3-formylbutanol-1 acetate. The yield is 53% of theory.

EXAMPLE 2

172 parts of butene-2-diol-1,4-diacetate, 0.5 part of rhodium-III chloride and 2 parts of triphenyl phosphite are contacted with a mixture of carbon monoxide and hydrogen (1:1 by volume) for 3 hours at 130° C. and 400 atmospheres by the method described in Example 1. After working up the reaction mixture in a similar manner by distillation there are obtained 91 parts of 3-formylbutanol-1 acetate, B.P. 75° C./6 mm. The yield is 64% of theory.

EXAMPLE 3

(A) 500 parts of butene-2-diol-1,4 diacetate, 500 parts of benzene and 0.5 part of rhodium-III chloride are contacted with a mixture of carbon monoxide and hydrogen (1:1 by volume) for 9 hours at 140° C. and 250 atmospheres. A total of 200 atmospheres of the gas mixture is absorbed. The resulting reaction mixture is fractionally distilled. There are thus obtained 546 parts of benzene and 160 parts of a mixture boiling at 92–106° C./18 mm. Hg. This mixture is shown by gas chromatographic analysis to contain 84% of 3-formylbutanol-1 acetate. The residue comprises 351 parts.

(B) The 351 parts of residue obtained in Example 3A are reacted under the reaction conditions stated in Example 3A together with 150 parts of butene-2-diol-1,4 acetate, 456 parts of the first runnings obtained in Example 3A and 44 parts of fresh benzene. The total amount of gas mixture absorbed is 70 atmospheres. Fractional distillation produces 385 parts of benzene and 130 parts of a mixture shown by gas chromatographic analysis to contain 80% of 3-formylbutanol-1 acetate. The residue comprises 391 parts.

(C) The 391 parts of residue from Example 3B are reacted under the reaction conditions stated in Example 3A together with 109 parts of butene-2-diol-1,4 diacetate, 385 parts of benzene from Example 3B and 115 parts of fresh benzene. Fractional distillation produces 439 parts of benzene and 177 parts of a mixture boiling at 90–109° C./20 mm. Hg and shown by gas chromatographic analysis to contain 77% of 3-formylbutanol-1 acetate. The yield obtained from all three experiments is 52% of theory.

EXAMPLE 4

5,000 parts of butene-2-diol-1,4 diacetate, 15,000 parts of benzene and 0.1 part of rhodium-III chloride are placed in a stainless steel autoclave. The autoclave is purged with nitrogen, and then at room temperature, a mixture of carbon monoxide and hydrogen (1:1 by volume) is pumped in to a pressure of 200 atmospheres. The reaction mixture is then heated at 90° C. and the pressure raised to 650 atmospheres. This pressure is maintained over 4 hours by pumping in the said gas mixture as required. A total of 350 atmospheres of gas mixture is absorbed. The temperature is then raised to 130° C. and the reaction continued for a further four hours, during which a further 180 atmospheres of gas mixture are absorbed. After cooling and releasing the pressure there are obtained 20,380 parts of reaction mixture. In a rotary film evaporator benzene and 1 part of acetic acid formed in the reaction are distilled off at 50 mm. Hg. The residue comprises 5,350 parts, of which 4,010 parts are further purified by fractional distillation. There are obtained 2,846 parts of 3-formylbutanol-1 acetate boiling at 99–102° C./20 mm. Hg and 99% pure. The residue consists of 388 parts of a brown oil. The yield of 3-formylbutanol-1 acetate is 89% of theory. The 2,4-dinitrophenyl hydrazone produced in acetic acid solution and showing a very high degree of crystallization has M.P. 97° C.

We claim:

1. Carboxylic acid esters of 3-formylbutanol-1 of the formula:

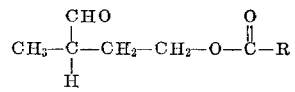

where R stands for hydrogen or an alkyl radical of from 1 to 3 carbon atoms.

2. A process for the manufacture of esters of 3-formylbutanol-1 with saturated fatty acids containing from 1 to 18 carbon atoms or benzoic acid which may contain, as substituents, 1 or 2 alkoxy or alkyl groups of from 1 to 4 carbon atoms, chlorine atoms, nitro groups or amino groups, comprising contacting diesters of butene-2-diol-1,4 with saturated fatty acids containing from 1 to 18 carbon atoms or benzoic acid containing, as substituents, 1 or 2 alkoxy or alkyl groups of from 1 to 4 carbon atoms, chlorine atoms, nitro groups or amino groups, with carbon monoxide and hydrogen in the presence of carbonyl complexes of rhodium at temperature of from more than 110° to 150° C. and pressures of from 150 to 800 atmospheres.

3. A process as claimed in claim 2 wherein the starting material is selected from diesters of butene-2-diol-1,4 with fatty acids containing from 1 to 4 carbon atoms.

4. A process as claimed in claim 2 wherein the gas mixture used contains carbon monoxide and hydrogen in a ratio of from 2:1 to 1:2 by volume.

5. A process as claimed in claim 2 wherein 0.001 to 0.1% by weight of rhodium is used in the form of carbonyl complexes.

6. A process as claimed in claim 2 wherein the reaction is carried out at temperatures ranging from 120° to 140° C.

7. A process as claimed in claim 2 wherein the reaction is carried out at pressures ranging from 350 to 800 atmospheres.

References Cited

UNITED STATES PATENTS 3,442,930   5/1969   McConnell et al. _____ 260—491

LORRAINE A. WEINBERGER, Primary Examiner

V. GARNER, Assistant Examiner

U.S. Cl. X.R.

260—404, 408, 410.9 R, 471 R, 473 R, 476 R, 482 R, 483, 484 R, 487, 491, 602